(12) United States Patent
Poikselka et al.

(10) Patent No.: US 10,194,355 B2
(45) Date of Patent: Jan. 29, 2019

(54) METHOD, APPARATUS AND COMPUTER PROGRAM

(71) Applicant: NOKIA SOLUTIONS AND NETWORKS OY, Espoo (FI)

(72) Inventors: Miikka Juhana Poikselka, Espoo (FI); Jari Mutikainen, Lepsama (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 52 days.

(21) Appl. No.: 15/111,140

(22) PCT Filed: Jan. 13, 2014

(86) PCT No.: PCT/EP2014/050503
§ 371 (c)(1),
(2) Date: Jul. 12, 2016

(87) PCT Pub. No.: WO2015/104065
PCT Pub. Date: Jul. 16, 2015

(65) Prior Publication Data
US 2016/0337908 A1    Nov. 17, 2016

(51) Int. Cl.
*H04W 4/12* (2009.01)
*H04W 36/00* (2009.01)
*H04W 4/90* (2018.01)
*H04W 76/50* (2018.01)

(52) U.S. Cl.
CPC ......... *H04W 36/0022* (2013.01); *H04W 4/12* (2013.01); *H04W 4/90* (2018.02); *H04W 36/0027* (2013.01); *H04W 76/50* (2018.02)

(58) Field of Classification Search
CPC ..... H04W 4/12; H04W 4/22; H04W 36/0022; H04W 76/007; H04W 36/14
See application file for complete search history.

(56) References Cited

U.S. PATENT DOCUMENTS 9,635,705 B2 * 4/2017 Lu .................. H04W 84/00
9,653,088 B2 * 5/2017 Rajendran ............ G10L 19/022
(Continued)

FOREIGN PATENT DOCUMENTS

WO    2013/135316 A1    9/2013

OTHER PUBLICATIONS

International Search Report and Written Opinion dated Nov. 10, 2014 corresponding to International Patent Application No. PCT/EP2014/050503.
(Continued)

*Primary Examiner* — Wei Zhao
(74) *Attorney, Agent, or Firm* — Squire Patton Boggs (US) LLP

(57) ABSTRACT

A method comprises receiving information for handover of a user equipment from a first connection to a second connection. The information for handover comprises information of a real-time text component of a call in progress in the first connection. The first connection comprises one of a packet switched connection and a circuit switched connection, and the second connection comprises the other of a packet switched connection and a circuit switched connection. The method further comprises using the information for handover to enable continuity of the real-time text component in the second connection.

5 Claims, 7 Drawing Sheets

(56) References Cited

U.S. PATENT DOCUMENTS

2008/0192736 A1* 8/2008 Jabri ............... G11B 27/034
370/352
2013/0017805 A1* 1/2013 Andre-Jonsson et al. ...................
H04W 36/0066
455/411

OTHER PUBLICATIONS

S2-091973; Qualcomm Europe; "Use of a 380 Response for an undetected IMS Emergency Call"; 3GPP TSG-SA WG2 Meeting #72; Hangzhou, P. R. China, Mar. 3-Apr. 3, 2009; Change Request; 10 pages.

3GPP TS 23.226 V11.0.0 (Sep. 2012); 3rd Generation Partnership Project; Technical Specification Group Services and System Aspects; Global Text Telephony (GTT); Stage 2 (Release 11); 28 pages.

RFC 4103; G. Hellstrom, et al.; "RTP Payload for Text Conversation"; Network Working Group; Jun. 2005; 20 pages.

3GPP TS 23.216 V12.0.0 (Dec. 2013); 3rd Generation Partnership Project; Technical Specification Group Services and System Aspects; Single Radio Voice Call Continuity (SRVCC); Stage 2 (Release 12); 69 pages.

3GPP TS 23.237 V12.4.0 (Sep. 2013); 3rd Generation Partnership Project; Technical Specification Group Services and System Aspects; IP Multimedia Subsystem (IMS) Service Continuity; Stage 2 (Release 12); 172 pages.

3GPP TS 24.237 V12.3.0 (Dec. 2013); 3rd Generation Partnership Project; Technical Specification Group Core Network and Terminals; IP Multimedia (IM) Core Network (CN) subsystem IP Multimedia Subsystem (IMS) Service Continuity; Stage 3 (Release 12); 434 pages.

3GPP TS 29.212 V12.3.0 (Dec. 2013); 3rd Generation Partnership Project; Technical Specification Group Core Network and Terminals; Policy and Charging Control (PCC); Reference points (Release 12); 217 pages.

3GPP TS 29.274 V12.3.0 (Dec. 2013); 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12); 236 pages.

3GPP TS 29.280 V12.1.0 (Dec. 2013); 3rd Generation Partnership Project; Technical Specification Group Core Network and Terminals; Evolved Packet System (EPS); 3GPP Sv interface (MME to MSC, and SGSN to MSC) for SRVCC (Release 12); 23 pages.

* cited by examiner

METHOD, APPARATUS AND COMPUTER PROGRAM

The invention relates to a method, apparatus and computer program, and in particular but not exclusively to a method, apparatus and computer program for control of calls comprising a text component.

BACKGROUND

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how communication devices can access the communication system and how various aspects of communication shall be implemented between communicating devices. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN). A wireless system can be divided into cells, and hence these are often referred to as cellular systems. A cell is provided by a base station. Cells can have different shapes and sizes. A cell can also be divided into sectors. Regardless of the shape and size of the cell providing access for a user equipment, and whether the access is provided via a sector of a cell or a cell, such area can be called radio service area or access area. Neighbouring radio service areas typically overlap, and thus a communication in an area can listen to more than one base station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

Examples of communication systems attempting to satisfy the increased demands for capacity are architectures that are being standardized by the 3rd Generation Partnership Project (3GPP), such as the long-term evolution (LTE), or the Universal Mobile Telecommunications System (UMTS) radio-access technologies. The LTE aims to achieve various improvements, for example reduced latency, higher user data rates, improved system capacity and coverage, reduced cost for the operator and so on. A further development of the LTE is often referred to as LTE-Advanced. The various development stages of the 3GPP LTE specifications are referred to as releases.

In LTE-Advanced the network nodes can be wide area network nodes such as a macro eNodeB (eNB) which may, for example, provide coverage for an entire cell. Alternatively in LTE-Advanced, network nodes can be small area network nodes such as Home eNBs (HeNB) (femto cells) or pico eNodeBs (pico-eNB). HeNBs may be configured to support local offload and may support any UE or UEs belonging to a closed subscriber group (CSG) or an open subscriber group (OSG). Pico eNBs can, for example, be configured to extend the range of a cell. In some instances a combination of wide area network nodes and small area network nodes can be deployed using the same frequency carriers (e.g. co-channel deployment). In UMTS multiple base stations (Node-Bs) may be controlled by one or more radio network controllers (RNCs).

Real-time text telephony services may be provided in cellular networks, whereby text can be transmitted as it is being typed or otherwise created (e.g. transcribed from a voice call). Global text telephony (GTT), or teletypewriter (TTY) in public switched telephone network (PSTN), is a real-time text service for deaf and/or hearing impaired persons. In Global System for Mobile communications (GSM) an audio codec, cellular text telephony modem (CTM), is used to transmit the text along a circuit switched (CS) speech call. ITU-T T.140, by the International Telegraph Union Telecommunication Standardisation Sector, defines a protocol for real-time text applications. IETF RFC 4103 defines how T.140 is carried over Real-time Transport Protocol (RTP)/User Datagram Protocol (UDP) in IP networks. IETF RFC 4103 is used for GTT services in Session Initiation Protocol (SIP)/IP Multimedia Subsystems (IMS).

STATEMENT

In a first aspect there is provided a method comprising: receiving information for handover of a user equipment from a first connection to a second connection, said information comprising information of a real-time text component of a call in progress in said first connection, said first connection comprising one of a packet switched connection and a circuit switched connection, and the second connection comprising the other of a packet switched connection and a circuit switched connection; and using said information to enable continuity of said real-time text component in said second connection.

Preferably said real-time text component comprises an emergency call.

Preferably said information comprises a flag contained in a request for said handover.

Preferably said request is received from a mobility management entity.

Preferably said real-time text component comprises a T.140 real-time text protocol in said packet-switched connection, and a cellular text telephony modem codec in said circuit switched connection.

Preferably said method comprises reserving resources in said second connection for said real-time text component.

Preferably said information is received at a mobile switching centre.

In a second aspect there is provided a method comprising: receiving, from a node, a request for continuity of a call during or after handover of a user equipment from a first connection to a second connection, said first connection comprising one of a packet switched connection and a circuit switched connection, and the second connection comprising the other of said packet switched connection and said circuit switched connection; determining whether said call comprises a real-time text component; and informing said node when it is determined that said call comprises a real-time text component.

Preferably said real-time text component comprises one of a T.140 real-time text protocol component and a cellular text telephony modem codec component.

Preferably said request is received at an emergency access transfer function.

Preferably said node comprises a mobile switching centre.

Preferably said call comprises an emergency call.

In a third aspect there is provided a method comprising: receiving and storing real-time text information of a call in progress by a user equipment in a first connection; receiving information that a handover of said user equipment from said first connection to a second connection is required, wherein said first connection comprises one of a packet switched connection and a circuit switched connection, and the second connection comprises the other of a packet switched connection and a circuit switched connection; and sending information of said handover to a node, and further sending said stored real-time text information to said node.

Preferably said information that a handover is required comprises a single radio voice call continuity request received from a base station.

Preferably said node comprises a single radio voice call continuity mobile switching centre.

Preferably said real-time text information is received in a request to create a new bearer or a request to update a bearer.

In a fourth aspect there is provided a method comprising: sending, from a user equipment, a message comprising information of a handover of said user equipment from a first connection to a second connection, wherein said first connection comprises one of a packet switched connection and a circuit switched connection, and the second connection comprises the other of a packet switched connection and a circuit switched connection; and sending further information from said user equipment of a real-time text component of a call in progress in said first connection and which needs to be continued in said second connection.

Preferably said further information is comprised in said message.

Preferably said message comprises a handover complete message.

Preferably said real-time text component comprises an emergency call.

In a fifth aspect there is provided a computer program comprising computer executable instructions which when run on one or more processors perform the method of any of the previous aspects.

In a sixth aspect there is provided an apparatus comprising at least one processor; and at least one memory including computer program code; the at least one memory and the computer program code configured to, with the at least one processor, cause the apparatus at least to: receive information for handover of a user equipment from a first connection to a second connection, said information comprising information of a real-time text component of a call in progress in said first connection, said first connection comprising one of a packet switched connection and a circuit switched connection, and the second connection comprising the other of a packet switched connection and a circuit switched connection; and use said information to enable continuity of said real-time text component in said second connection.

Preferably said real-time text component comprises an emergency call.

Preferably said information comprises a flag contained in a request for said handover.

Preferably said request is received from a mobility management entity.

Preferably said real-time text component comprises a T.140 real-time text protocol in said packet-switched connection, and a cellular text telephony modem codec in said circuit switched connection.

Preferably the apparatus is configured to reserve resources in said second connection for said real-time text component.

Preferably said apparatus comprises a mobile switching centre.

In a seventh aspect there is provided an apparatus comprising: means for receiving information for handover of a user equipment from a first connection to a second connection, said information comprising information of a real-time text component of a call in progress in said first connection, said first connection comprising one of a packet switched connection and a circuit switched connection, and the second connection comprising the other of a packet switched connection and a circuit switched connection; and means for using said information to enable continuity of said real-time text component in said second connection.

Preferably said real-time text component comprises an emergency call.

Preferably said information comprises a flag contained in a request for said handover.

Preferably said request is received from a mobility management entity.

Preferably said real-time text component comprises a T.140 real-time text protocol in said packet-switched connection, and a cellular text telephony modem codec in said circuit switched connection.

Preferably the apparatus comprises means for reserving resources in said second connection for said real-time text component.

Preferably said apparatus comprises a mobile switching centre.

In an eighth aspect there is provided an apparatus comprising: at least one processor; and at least one memory including computer program code; the at least one memory and the computer program code configured to, with the at least one processor, cause the apparatus at least to: receive, from a node, a request for continuity of a call during or after handover of a user equipment from a first connection to a second connection, said first connection comprising one of a packet switched connection and a circuit switched connection, and the second connection comprising the other of said packet switched connection and said circuit switched connection; determine whether said call comprises a real-time text component; and inform said node when it is determined that said call comprises a real-time text component.

Preferably said real-time text component comprises one of a T.140 real-time text protocol component and a cellular text telephony modem codec component.

Preferably said apparatus comprises an emergency access transfer function.

Preferably said node comprises a mobile switching centre.

Preferably said call comprises an emergency call.

In a ninth aspect there is provided an apparatus comprising: means for receiving, from a node, a request for continuity of a call during or after handover of a user equipment from a first connection to a second connection, said first connection comprising one of a packet switched connection and a circuit switched connection, and the second connection comprising the other of said packet switched connection and said circuit switched connection; means for determining whether said call comprises a real-time text component; and means for informing said node when it is determined that said call comprises a real-time text component.

Preferably said real-time text component comprises one of a T.140 real-time text protocol component and a cellular text telephony modem codec component.

Preferably said apparatus comprises an emergency access transfer function.

Preferably said node comprises a mobile switching centre.

Preferably said call comprises an emergency call.

In a tenth aspect there is provided an apparatus comprising at least one processor; and at least one memory including computer program code; the at least one memory and the computer program code configured to, with the at least one processor, cause the apparatus at least to: receive and store real-time text information of a call in progress by a user equipment in a first connection; receive information that a handover of said user equipment from said first connection to a second connection is required, wherein said first connection comprises one of a packet switched connection and a circuit switched connection, and the second connection comprises the other of a packet switched connection and a circuit switched connection; and send information of said handover to a node, and further send said stored real-time text information to said node.

Preferably said information that a handover is required comprises a single radio voice call continuity request received from a base station.

Preferably said node comprises a single radio voice call continuity mobile switching centre.

Preferably said apparatus is configured to receive said real-time text information in a request to create a new bearer or a request to update a bearer.

In an eleventh aspect there is provided an apparatus comprising: means for receiving and storing real-time text information of a call in progress by a user equipment in a first connection; means for receiving information that a handover of said user equipment from said first connection to a second connection is required, wherein said first connection comprises one of a packet switched connection and a circuit switched connection, and the second connection comprises the other of a packet switched connection and a circuit switched connection; and means for sending information of said handover to a node, and means for further sending said stored real-time text information to said node.

Preferably said information that a handover is required comprises a single radio voice call continuity request received from a base station.

Preferably said node comprises a single radio voice call continuity mobile switching centre.

Preferably said apparatus comprises means for receiving said real-time text information in a request to create a new bearer or a request to update a bearer.

In a twelfth aspect there is provided an apparatus comprising at least one processor; and at least one memory including computer program code; the at least one memory and the computer program code configured to, with the at least one processor, cause the apparatus at least to: send a message comprising information of a handover of said apparatus from a first connection to a second connection, wherein said first connection comprises one of a packet switched connection and a circuit switched connection, and the second connection comprises the other of a packet switched connection and a circuit switched connection; and send further information from said apparatus of a real-time text component of a call in progress in said first connection and which needs to be continued in said second connection.

Preferably said further information is comprised in said message.

Preferably said message comprises a handover complete message.

Preferably said real-time text component comprises an emergency call.

Preferably said apparatus comprises a user equipment.

In a thirteenth aspect there is provided an apparatus comprising: means for sending a message comprising information of a handover of said apparatus from a first connection to a second connection, wherein said first connection comprises one of a packet switched connection and a circuit switched connection, and the second connection comprises the other of a packet switched connection and a circuit switched connection; and means for sending further information from said apparatus of a real-time text component of a call in progress in said first connection and which needs to be continued in said second connection.

Preferably said further information is comprised in said message.

Preferably said message comprises a handover complete message.

Preferably said real-time text component comprises an emergency call.

Preferably said apparatus comprises a user equipment.

BRIEF DESCRIPTION OF THE DRAWINGS

Some embodiments will now be described by way of example only with reference to the following Figures in which.

DESCRIPTION OF SOME EMBODIMENTS

In the following certain exemplifying embodiments are explained with reference to a wireless or mobile communication system serving communication devices. Before explaining in detail the exemplifying embodiments, certain general principles of a wireless communication system, access systems thereof, and communication devices are briefly explained with reference to FIGS. 1 to 3 to assist in understanding the technology underlying the described examples.

Figure 1:
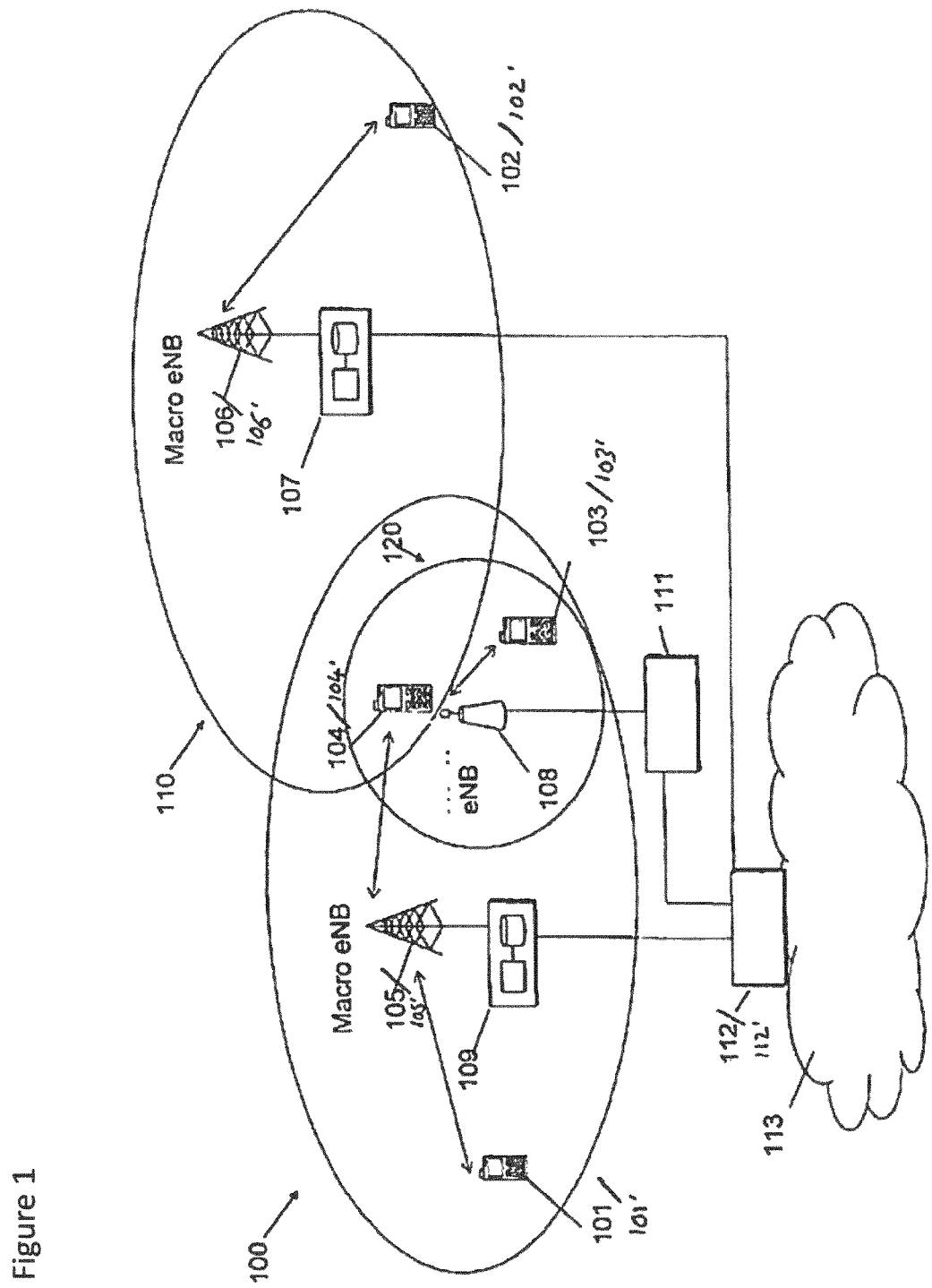
FIG. 1 shows a schematic diagram of a network according to some embodiments.

A communication device or user equipment 101, 102, 103, 104 is typically provided wireless access via at least one base station or similar wireless transmitter and/or receiver node of an access system. In FIG. 1 three neighbouring and overlapping access systems or radio service areas 100, 110 and 120 are shown being provided by base stations 105, 106, and 108.

However, it is noted that instead of three access systems, any number of access systems can be provided in a communication system. An access system can be provided by a cell of a cellular system or another system enabling a communication device to access a communication system. A base station site 105, 106, 108 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each communication device 101, 102, 103, 104, and base station 105, 106, and 108 may have one or more radio channels open at the same time and may send signals to and/or receive signals from more than one source.

Base stations 105, 106, 108 are typically controlled by at least one appropriate controller apparatus 109, 107 so as to enable operation thereof and management of communication devices 101, 102, 103, 104 in communication with the base stations 105, 106, 108. The control apparatus 107, 109 can be interconnected with other control entities. The control apparatus 109 can typically be provided with memory capacity 301 and at least one data processor 302. The control apparatus 109 and functions may be distributed between a plurality of control units. Although not shown in FIG. 1, in some embodiments each base station 105, 106 and 108 can comprise a control apparatus 109, 107.

The cell borders or edges are schematically shown for illustration purposes only in FIG. 1. It shall be understood that the sizes and shapes of the cells or other radio service areas may vary considerably from the similarly sized omni-directional shapes of FIG. 1.

In particular, FIG. 1 depicts two wide area base stations 105, 106, which can be macro-eNBs 105, 106 in an LTE system. The macro-eNBs 105, 106 transmit and receive data over the entire coverage of the cells 100 and 110 respectively. FIG. 1 also shows a smaller area base station or access point which in some embodiments can be a pico, a femto or Home eNB 108. The coverage of the smaller area base station 108 is generally smaller than the coverage of the wide area base stations 105, 106. The coverage provided by the smaller area node 108 overlaps with the coverage provided by the macro-eNBs 105, 106. Pico eNBs can be used to extend coverage of the macro-eNBs 105, 106 outside the original cell coverage 100, 110 of the macro-eNBs 105, 106. The pico eNB can also be used to provide cell coverage in "gaps" or "shadows" where there is no coverage within the existing cells 100, 110 and/or may serve "hot spots". In some embodiments, the smaller area node can be a femto or Home eNB which can provide coverage for a relatively small area such as the home. Some environments may have both pico and femto cells.

As shown, the radio service areas can overlap. Thus signals transmitted in an area can interfere with communications in another area (macro to macro, pico/femto to either one or both of the macro cells, and/or pico/femto to pico/femto).

The communication devices 101, 102, 103, 104 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

Some non-limiting examples of the recent developments in communication systems are the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access systems include those provided by base stations of systems that are based on technologies such as wireless local area network (WLAN) and/or WiMax (Worldwide Interoperability for Microwave Access).

In FIG. 1 the base stations 105, 106, 108 of the access systems can be connected to a wider communications network 113. A controller apparatus 107, 109 may be provided for coordinating the operation of the access systems. A gateway function 112 may also be provided to connect to another network via the network 113. The smaller area base station 108 can also be connected to the other network by a separate gateway function 111. The base stations 105, 106, 108 can be connected to each other by a communication link for sending and receiving data. The communication link can be any suitable means for sending and receiving data between the base stations 105, 106 and 108 and in some embodiments the communication link is an X2 link.

The other network may be any appropriate network. A wider communication system may thus be provided by one or more interconnect networks and the elements thereof, and one or more gateways may be provided for interconnecting various networks.

It will be appreciated that embodiments may also be applicable to a UMTS network. In a UMTS network user equipment 101', 102', 103' and 104' may be in communication with NodeBs 105' and 106'. The Node Bs 105' and 106' may themselves be controlled by an RNC 112'

Figure 2:
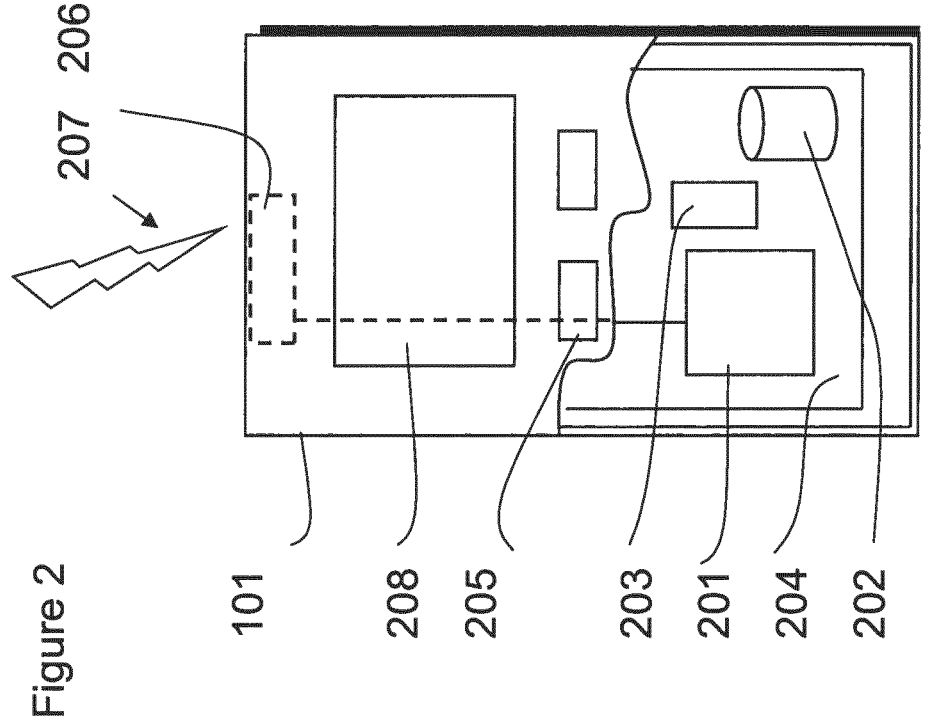
FIG. 2 shows a schematic diagram of a communication device according to some embodiments.

The communication devices will now be described in more detail with reference to FIG. 2. FIG. 2 shows a schematic, partially sectioned view of a communication device 101 that a user can use for communication. Of course the other communication devices shown in FIG. 1 may have the same or similar features. Such a communication device is often referred to as user equipment (UE) or terminal. An appropriate communication device may be provided by any device capable of sending and receiving radio signals. The communication device may be mobile or may be generally stationary. Non-limiting examples include a mobile station (MS) such as a mobile phone or what is known as a 'smart phone', a portable computer provided with a wireless interface card or other wireless interface facility, personal data assistant (PDA) provided with wireless communication capabilities, a computer or any combinations of these or the like.

A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The device 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the communication device.

The communication device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the communication device by means of a suitable user interface such as key pad 205, voice commands, touch sensitive screen or pad, combinations thereof or the like. A display 208, a speaker and a microphone can be also provided. Furthermore, a communication device may comprise appropriate connectors (either wired or wireless) to other devices and/or for connecting external accessories, for example hands-free equipment, thereto.

Figure 3:
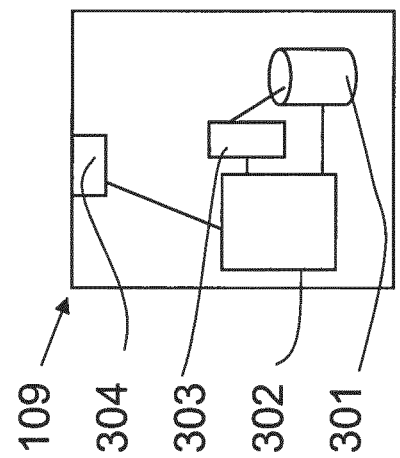
FIG. 3 shows a schematic diagram of a control apparatus according to some embodiments.

FIG. 3 shows an example of a control apparatus 109 for a communication system, for example to be coupled to and/or for controlling a station of an access system. In some embodiments the base stations 105, 106, and 108 comprise a control apparatus 109. In some embodiments, each base station will have a control apparatus. In other embodiments the control apparatus can be another network element. The control apparatus 109 can be arranged to provide control of communications by communication devices that are in the service area of the system. The control apparatus 109 can be configured to provide control functions in association with generation and communication of transmission patterns and other related information by means of the data processing facility in accordance with certain embodiments described below. For this purpose the control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions.

Single Radio Voice Call Continuity (SRVCC) was first defined in 3GPP Rel-8, and then extended in later releases e.g. for calls in alerting call state, and for calls with active mid-call services (hold, conferencing etc.) SRVCC for IMS emergency voice calls was defined in 3GPP Rel-9. SRVCC allows for handover between a packet-switched call in LTE and a circuit-switched call in a legacy system, such as WCDMA.

The present inventors have realised that a UE may have an ongoing GTT session in IMS when the SRVCC occurs. In IMS the QCI=1 bearer is typically used for both voice and T.140 real-time text. The policy to which QCI is used for T.140 is not standardized, but it should be using the QCI (Quality of Service Class Identifier)=1 bearer, otherwise the IMS network, in particular the so-called Emergency Access Transfer Function (EATF), may remove the media after the SRVCC which may cause the T.140 real-time text service to be discontinued. Accordingly to continue to use the real-time text service after the SRVCC the QCI=1 bearer may still need to be used; however even in this case the real-time text may still be released.

In SRVCC the QCI=1 bearer is moved from the packet switched (PS) network to circuit switched radio access technology (CS RAT) (UTRAN/GERAN). Accordingly The UE must swap the real-time text codec from T.140 over RTP/UDP/IP to the GSM CTM codec. The SRVCC-MSC (Mobile Switching Centre) needs to reserve the media resources from the media gateway (MGW) for CTM/T.140 transcoder, and negotiate the use of a T.140 real time text media with the IMS network accordingly. However, the MSC may not be aware of the ongoing T.140 media in the SIP/IMS session. This means the GTT service may not be possible after the UE has moved to CS due to SRVCC. This may be undesirable, in particular for emergency calls. The provision of GTT for emergency calls is a regulatory requirement in some countries such as the US.

Figure 4:
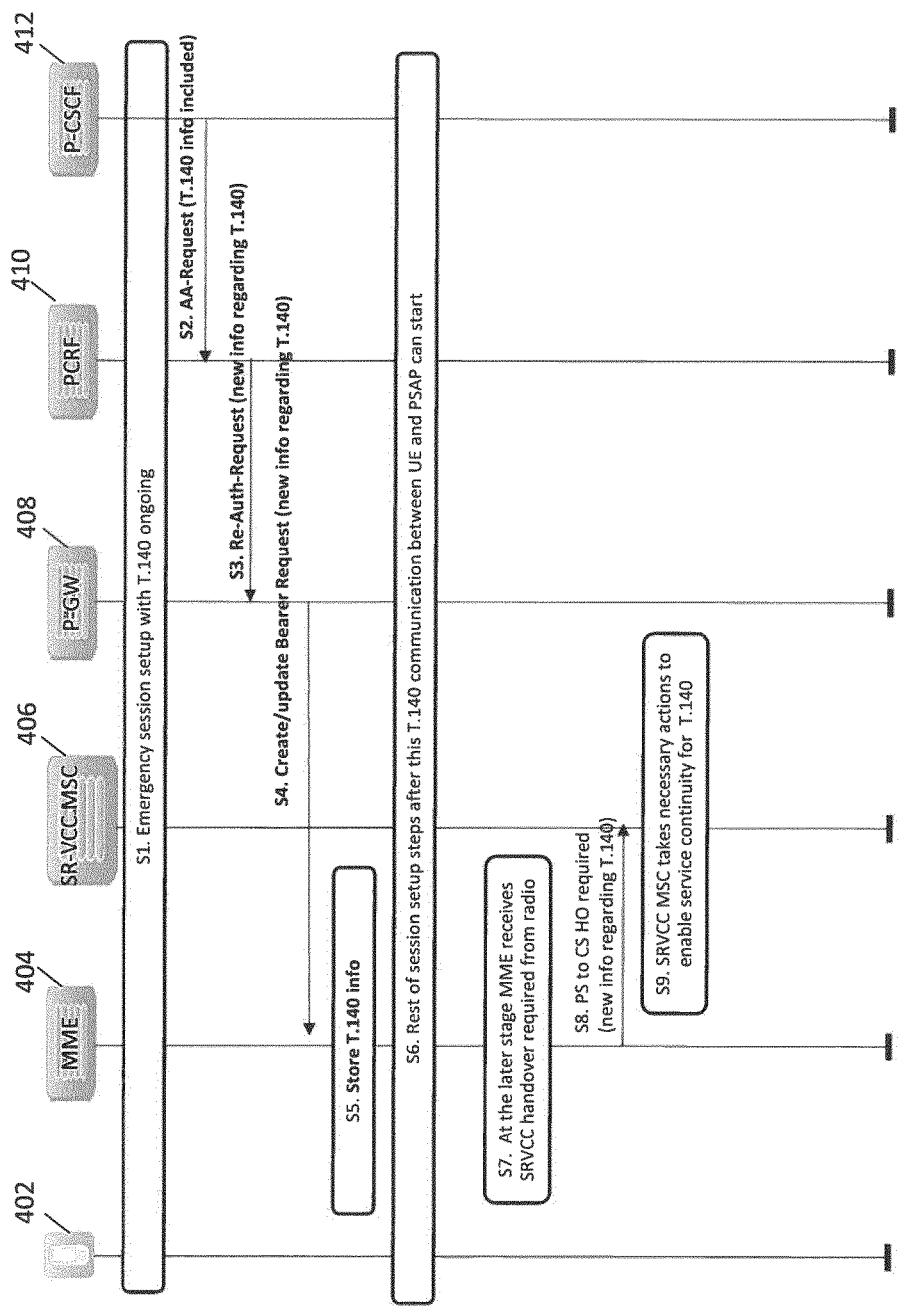
FIG. 4 shows a signalling diagram according to an embodiment.

A signalling diagram according to a first embodiment is shown in FIG. 4. This embodiment may utilise dynamic policy control and charging (PCC) using a policy and charging rules function (PCRF), and the Sv interface from the MME. FIG. 4 shows the signalling between a UE 402, an MME 404, an SR-VCC MSC 406, a packet data network gateway (P-GW) 408, a policy and charging rules function (PCRF) 410, and a proxy call state control function (P-CSCF) 412.

It is shown at step S1 that an emergency session is set up with T.140 real-time text ongoing.

At step S2 an authentication and authorization (AA) request is sent from the P-CSCF 412 to the PCRF 410. This request includes information about an ongoing real-time text component of the session, in this case T.140 information.

At step S3 a re-authentication request is sent from the PCRF 410 to the P-GW 408. This re-authentication request may also forward the T.140 information that was sent to the PCRF at step S2. The PCRF 410 may also append further T.140 information prior to sending it to the P-GW 408.

At step S4 the P-GW 408 sends a "create bearer request" or "update bearer request" message to the MME 404. This message includes the T.140 information that was sent to the P-GW 408 at step S3. Further T.140 information may also be appended before sending to the MME 404.

At step S5 the MME 404 stores the T.140 information.

At step S6 the remaining steps required for session setup are carried out. Following this, T.140 communication between the UE 402 and a public safety answering point (PSAP) can start.

At step S7 the MME 404 receives an SRVCC handover request. This may be received from eNodeB. This request may include information that the handover is from a packet switched connection and/or network to a circuit switched connection and/or network.

At step S8 the MME 404 sends a message to the SR-VCC MSC 406 indicating that a handover is required from the packet switched connection and/or network to the circuit switched connection and/or network. This message also includes information regarding the ongoing T.140 call.

At step S9 the SR-VCC MSC takes the necessary actions to enable service continuity of the T.140 call when the handover has been completed to the circuit switched cell.

As part of this embodiment, the UE and PSAP may negotiate the use of T.140 in the IMS emergency session via the SDP offer/answer. This may be part of the initial call set-up in the packet-switched network i.e. prior to or as part of step S1 in FIG. 4.

The PCRF 410 may receive the T.140 media description from P-CSCF via Rx reference point. This may be part of step S2 in FIG. 4. Furthermore, the PCRF 410 may set the PCC rule and QoS parameters for the session to the PCEF (Policy and Charging Enforcement Function) via the Gx reference point. Furthermore, with the Proxy Mobile IP (PMIP) based S5/S8 reference points, the Gxx reference point may be used to set the QoS policy from the PCRF to the Bearer Binding and Event Reporting Function (BBERF) in the Serving Gateway (SGW).

The PCEF in P-GW may create or modify the one or more bearers according to the PCC rule and QoS parameters. The P-GW may send the "Create Bearer Request" or "Update Bearer Request" (see step S4) to SGW over S5/S8 interface when the dedicated bearer for QCI=1 is created.

The MME 404 may receive the Create Bearer Request or Update Bearer Request over the S11 interface from the SGW. It is noted that in FIG. 4 the Create Bearer Request or Update Bearer Request is received directly from the P-GW, but in other embodiments it may be received from or via the SGW The MSC 406 may receive the SRVCC PS-to-CS Request (see step S8 in FIG. 4) over the Sv interface from the MME 404 when the SRVCC occurs.

Regarding the Gx and Gxx reference points, the real-time text indicator could be carried by re-using the PS-to-CS-session-continuity Attribute Value Pair AVP (defined for video SRVCC), and extending it to include information for T.140.

According to TS 29.212 section 5.3.84, which is related to PS-to-CS-Session-Continuity AVP, it is proposed that the PS-to-CS-Session-Continuity AVP (AVP code 1099) is of type Enumerated, and indicates whether the service data flow is a candidate for PS to CS session continuity as specified in 3GPP TS 23.216 [40]. The following values are defined:

VIDEO_PS2CS_CONT_CANDIDATE (0)

This value is used to indicate that the service data flow carries video and is a candidate for PS to CS session continuity.

Some embodiments propose including the following further value:

T140_PS2CS_CONT_CANDIDATE (1)

This value is used to indicate that the service data flow carries real-time text and is a candidate for PS to CS session continuity.

The real-time text indicator could be carried by re-using the "Bearer Flags" in Bearer Context IE in Create Bearer Request or Update Bearer Request (step S4 in FIG. 4), and adding a further flag for T.140.

TS 29.274 section 7.2.3 states:

| Bearer Flags | Applicable flags are:<br>PPC (Prohibit Payload Compression): this flag may be set on the S5/S8 and S4/S11 interfaces.<br>vSRVCC indicator: This IE may be included by the PGW on the S5/S8 interface according to 3GPP TS 23.216 [43]. When received from S5/S8, SGW shall forward on the S11 interface. | Bearer Flags |
|---|---|---|

TS 29.274 section 8.32 discloses the following four Bits (Bit 1 to Bit 4):

Bit 1—PPC (Prohibit Payload Compression): This flag is used to determine whether an SGSN should attempt to compress the payload of user data when the users asks for it to be compressed (PPC=0), or not (PPC=1).

Bit 2—VB (Voice Bearer): This flag is used to indicate a voice bearer when doing PS-to-CS (v)SRVCC handover.

Bit 3—Vind (vSRVCC indicator): This flag is used to indicate that this bearer is an IMS video bearer and is candidate for PS-to-CS vSRVCC handover.

Bit 4—ASI (Activity Status Indicator): When set to 1, this flag indicates that the bearer context is preserved in the CN without corresponding Radio Access Bearer established. The target S4-SGSN shall keep the bearer context associated with this indicator preserved. When the target S4-SGSN sends Relocation Request message towards the target RNC, the target S4-SGSN may not request to setup the RABs for those bearer contexts associated with this indicator.

According to some embodiments there may be included a further Bit, referred to here as Bit 5:

Bit 5—T.140: This flag is used to indicate that this bearer is used for IMS real-time text service (T.140) and candidate for PS-to-CS handover With regard to step S8 in FIG. 4, the real-time text indicator could be carried by re-using and extending the Sv Flags IE in the SRVCC PC-to-CS Request. As set out in sections 5.2.2 and 6.11 in TS 29.280:

Bit 1—EmInd (Emergency Indicator): This flag is used to indicate the IMS emergency session.

Bit 2—ICS (IMS Centralized Service): This flag is used to request ICS support.

Bit 3—STI (Session Transfer Indicator): This flag is used to indicate IMS session transfer has been invoked.

Bit 4—VHO (vSRVCC flag): This flag is used to indicate that the vSRVCC HO is requested by the MME.

According to some embodiments there may be included a further Bit, referred to here as Bit 5:

Bit 5—T.140: This flag is used to indicate that the real-time text HO is requested by the MME.

If the MME initiates the PS-to-CS session continuity for emergency call, and the emergency voice (QCI=1) bearer has the T.140 media type flag set to indicate that there is ongoing real-time text, then the MME may send the SRVCC PS-to-CS Request with both Bits 1 and 5 set to "true". If the MME initiates the PS-to-CS session continuity for a regular call, and the voice (QCI=1) bearer has the T.140 media type flag set to indicate that there is ongoing real-time text, then the MME may send the SRVCC PS-to-CS Request with Bit 5 set to true.

If the UE has both emergency call and regular call ongoing at the same time when the SRVCC is initiated (the regular call may be on hold in this case), the MME may initiate the SRVCC for the emergency call, and the regular call may be dropped. In addition, the MME may determine not to include the T.140 indicator (Bit 5) if the emergency voice bearer does not have the T.140 flag set, even if the regular voice bearer had the T.140 flag set. The MME can distinguish the regular and emergency voice bearers based on the Access Point Name (APN) and Allocation and Retention Priority (ARP).

Upon receiving the T.140 real-time text indicator in the SRVCC PS-to-CS Request (see step S8 in FIG. 4), the MSC reserves (or causes to be reserved) the resources for T.140/CTM transcoder from the MGW and may send a corresponding SDP offer in an initial INVITE to the EATF.

Figure 5:
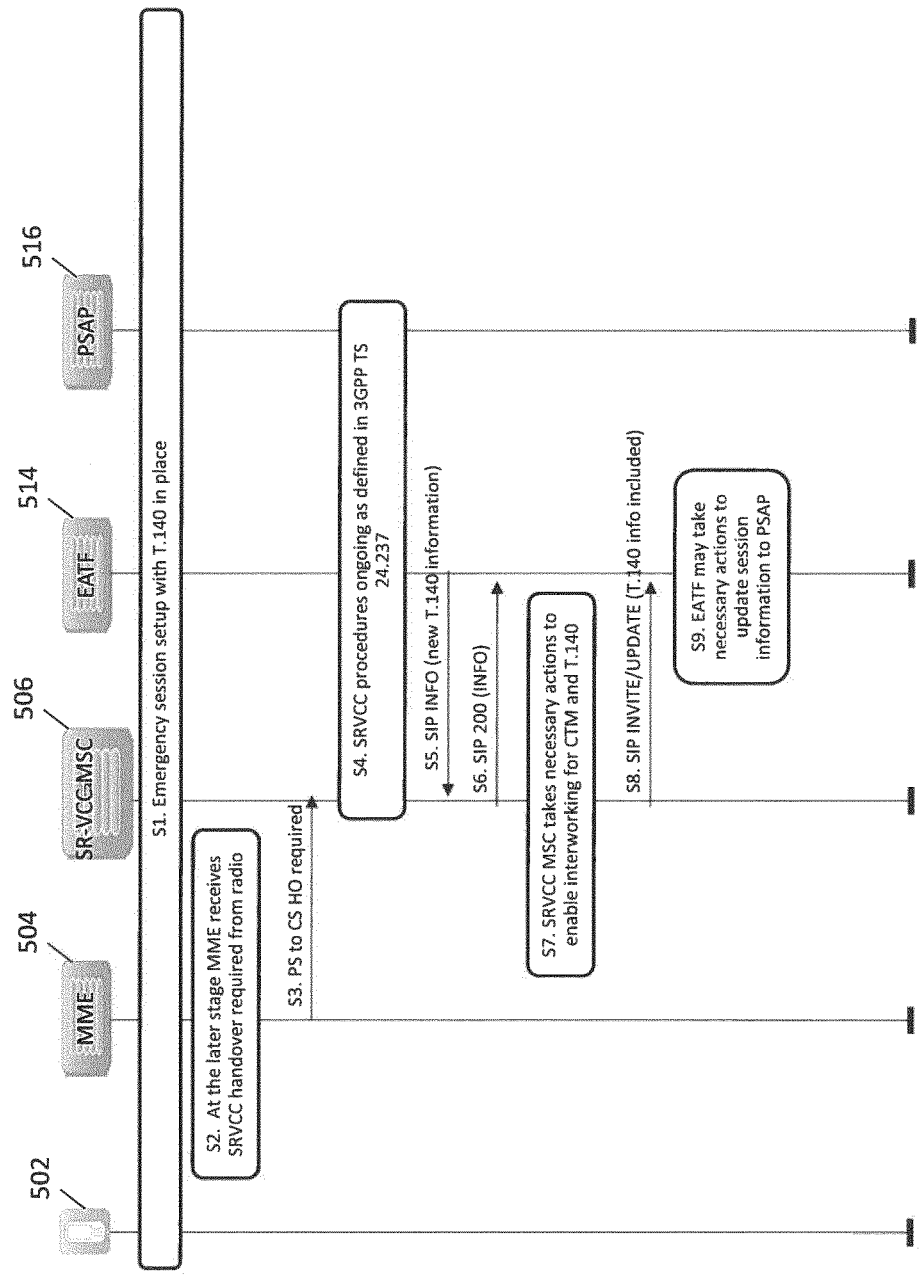
FIG. 5 shows a signalling diagram according to another embodiment.

A second embodiment is shown with respect to FIG. 5. This embodiment employs an emergency access transfer function (EATF) using the SR-VCC-alerting procedure.

At step S1 an emergency session is in progress, including T.140 real-time text.

At some point during the call, as shown at step S2 the MME 504 receives a request for SR-VCC handover. This request may be received from eNodeB. This request may include information that the handover is from a packet switched network and/or connection to a circuit switched network and/or connection.

At step S3 the MME 504 sends a message to the SR-VCC MSC 506 indicating that the packet switched to circuit switched handover is required.

At step S4 the SR-VCC procedures take place between the SR-VCC MSC 506, the EATF 514, and the PSAP 516. These procedures are set out in 3GPP TS 24.237.

At step S5 the EATF 514 sends SIP INFO to the SR-VCC MSC 506. This information may include T.140 information regarding the T.140 real-time text component in progress in the packet switched connection.

At step S6 information is sent from the SR-VCC MSC 506 to the EATF 514 in a SIP 200 message. This may indicate that the request was successful.

At step S7 the SR-VCC MSC takes the necessary actions to enable interworking for the CTM and T.140, such that the text element of the call can be continued in the circuit switched connection. In other words the real-time text operating under the T.140 protocol in the packet switched connection may continue using the CTM protocol in the circuit switched connection.

At step S8 a SIP INVITE/UPDATE message is sent from the SR-VCC MSC 506 to the EATF 514. This message may also include the T.140 information.

At step S9 the EATF may take the necessary actions to update the session information to the PSAP. This may indicate to the PSAP that the real-time text is being continued in the circuit-switched connection.

Considering the embodiment of FIG. 5 in more detail, the SRVCC-MSC 506 may send the domain transfer request (SIP INVITE) to the IMS network (see step S4 in FIG. 5). In the case of an IMS emergency session (as shown in FIG. 5 for example), the SIP INVITE is sent to the EATF entity 514 in the IMS network. The EATF 514 may then detect that the request from the SRVCC-MSC 506 contains only a voice media component (if this is indeed the case), whereas the session in LTE side contains the T.140 real-time text media component. Therefore the EATF 514 needs to inform the MSC 506 of the ongoing T.140 real-time text component. This information is sent at step S5 in FIG. 5. The T.140 information may be accompanied by other SIP information. The EATF 514 may be aware of the existence of the T.140 component from the SDP offer/answer between the UE 502 and PSAP 516.

In some embodiments, a Service Centralization and Continuity Application Server (SCC AS) can send additional information to the SRVCC-MSC in a SIP INFO message after the initial INVITE from the MSC to the SCC AS/ATCF (Access Transfer Control Function). Information carried in SIP INFO is specified in 3GPP TS 24.237. Annex D of TS 24.237 covers how information is encoded from SCC AS to SRVCC-MSC. The information can indicate, for example, that the session subject for SRVCC is currently in Alerting state (section D.2), or that the session is a conference session (section D.1).

The information regarding the T.140 component could, in some embodiments, be sent by re-using and extending the existing XML schema. Once the SRVCC-MSC gets the T.140 indication in the SIP INFO, the SRVCC-MSC may then reserve the resources for T.140/CTM transcoder from the MGW and sends a corresponding SDP offer in a re-INVITE or UPDATE to the EATF.

The current structure of state-and-event-info (3GPP TS 24.237 Annex D.2) is:

```
<xs:element name="state-and-event-info" type="Tstate-and-event-info"/>
  <xs:complexType name="Tstate-and-event-info">
    <xs:sequence>
      <xs:element name="state-info" type="xs:string"
        minOccurs="0" maxOccurs="1"/>
      <xs:element name="direction" type="directionType"
        minOccurs="0" maxOccurs="1"/>
      <xs:element name="event" type="xs:string"
        minOccurs="0" maxOccurs="1"/>
      <xs:element name="anyExt" type="anyExtType" minOccurs="0" />
      <xs:any   namespace="##other"   processContents="lax"
        minOccurs="0"
maxOccurs="unbounded"/>
    </xs:sequence>
```

According to one embodiment, to provide the necessary information regarding the real-time text call it is proposed to add an element such as "media" which may be on the same level as state-and-event-info (i.e. state-and-event-info is left untouched). Example encodings could be:

```
<xs:element name="media" type="Tmedia"/>
  <xs:complexType name="Tmedia">
    <xs:sequence>
      <xs:element name="mediatype" type="xs:string"
        minOccurs="0" maxOccurs="1"/>
      <xs:element name="anyExt" type="anyExtType" minOccurs="0" />
      <xs:any   namespace="##other"   processContents="lax"
        minOccurs="0"
maxOccurs="unbounded"/>
    </xs:sequence>
```

Where the "media" element is new and may further contain an element called "mediatype" that further contains details of the media. For example as follows:
mediatype=text
text=% x54.2d.31.34.30; "T.140"

In another embodiment it is proposed to add an additional "text" element inside the existing state-and-event-info. Example encoding could be:

```
<xs:complexType name="Tstate-and-event-info">
  <xs:sequence>
    <xs:element name="state-info" type="xs:string"
      minOccurs="0" maxOccurs="1"/>
    <xs:element name="direction" type="directionType"
      minOccurs="0" maxOccurs="1"/>
    <xs:element name="event" type="xs:string" minOccurs="0"
      maxOccurs="1"/>
```

-continued

```
<xs:element name="mediatype" type="xs:string"
  minOccurs="0" maxOccurs="1"/>
  <xs:element name="anyExt" type="anyExtType" minOccurs="0" />
  <xs:any namespace="##other" processContents="lax"
  minOccurs="0"
maxOccurs="unbounded"/>
  </xs:sequence>
``` mediatypevalues=text-value
text-value=% x54.2d.31.34.30; "T.140"

In another embodiment it is proposed to add an additional "text" element inside the existing state-info inside the state-and-event-info. Example encoding could be:
state-info-values=early-value/pre-alerting-value/text-value
early-value=% x65.61.72.6c.79; "early"
pre-alerting-value=%
x70.72.65.2d.61.6c.65.72.74.69.6e.67; "pre-alerting"
text-value=% x54.2d.31.34.30; "T.140"

Figure 6:
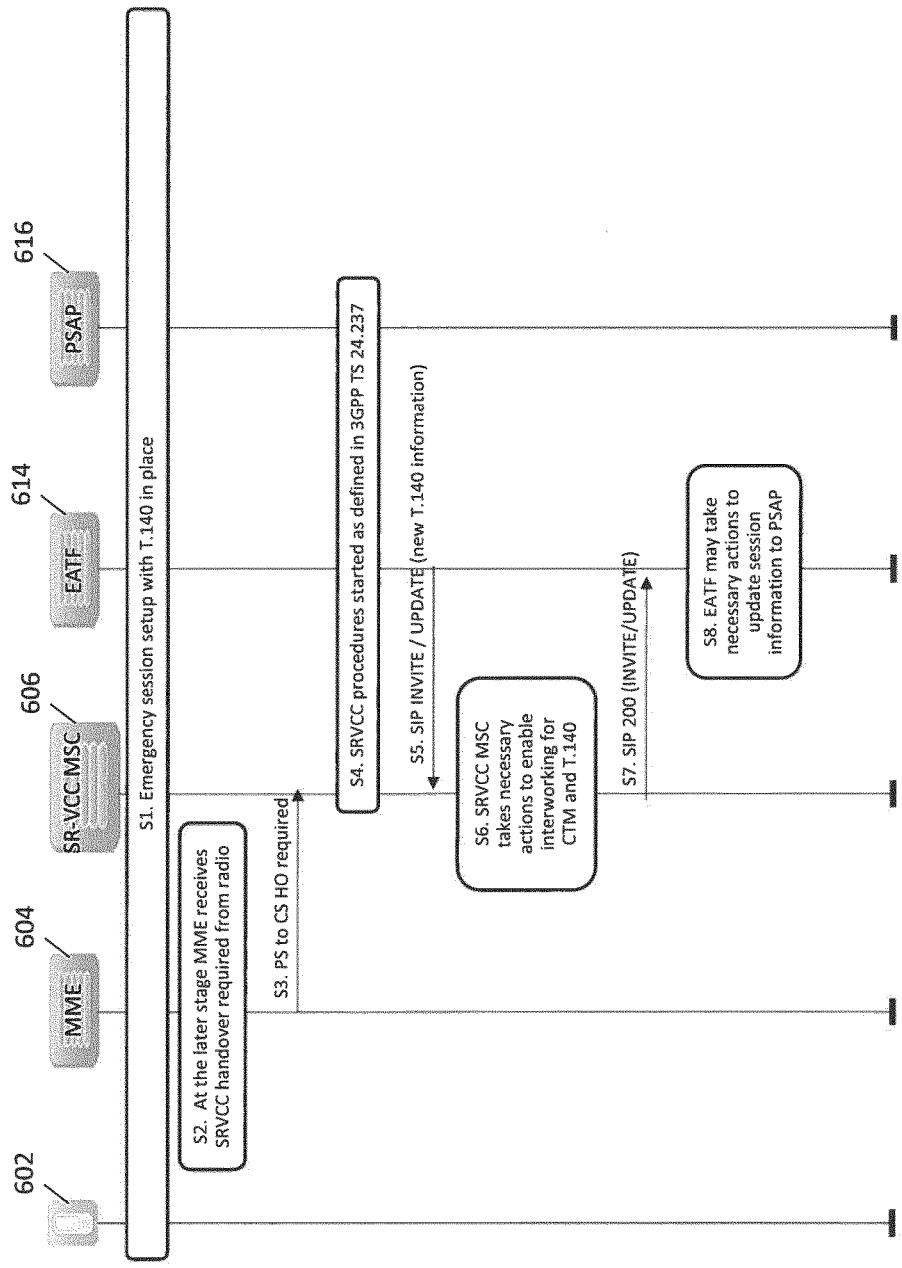
FIG. 6 shows a signalling diagram according to another embodiment.

A further embodiment is shown with respect to FIG. 6. This embodiment may employ the EATF using the third party call control procedure.

As shown at step S1 an emergency session is already set up, with T.140 real-time text in place.

At some point during the call, and as shown at step S2, the MME 604 receives a message from eNodeB that an SRVCC handover is required. This message may be received from eNodeB. This message may include information that the handover is from a packet switched connection to a circuit switched connection.

At step S3 the MME 604 sends a message to the SR-VCC MSC 606 indicating that a handover is required from the packet switched connection to the circuit switched connection.

At step S4 the SR-VCC procedures are started, as defined in 3GPP TS 24.237.

At step S5 a SIP INVITE/UPDATE message is sent from the EATF 614 to the SR-VCC MSC 606. This message may include T.140 information in the Session Description Protocol payload of the SIP INVITE/UPDATE message. It may be carried in the media line as follows:
"m=text 11000 RTP/AVP 98
a=rtpmap:98 t140/1000"

At step S6 the SR-VCC MSC 606 takes the necessary actions to enable interworking for the CTM and T.140, such that the text element of the call can be continued in the circuit switched connection.

At step S7 a SIP 200 INVITE/UPDATE message is sent from the SR-VCC MSC 606 to the EATF 614.

Using this information, and as shown at step S8, the EATF 614 may then take the necessary actions to update the session information, and to send such information to the PSAP 616. For example this information could inform the PSAP that a new termination point for T.140 has been selected due to handover.

Thus, the embodiment of FIG. 6 may be considered similar to the embodiment of FIG. 5, but instead of using the SIP INFO, the EATF 614 informs the SRVCC-MSC 606 about the ongoing T.140 real-time text media by sending a new SDP offer to the SRVCC-MSC 606. The SDP offer can be sent in a re-INVITE after it has sent a 200OK for the INVITE from the MSC, or in UPDATE if the EATF 614 needs to provide the SDP offer prior to the 200OK. The SDP offer may include a media description for T.140 media type, which may be negotiated with the remote end (e.g. PSAP). The SRVCC-MSC 606 then reserves the resources from the MGW for the T.140/CTM transcoder, and generates an SDP answer correspondingly to the EATF 614.

Figure 7:
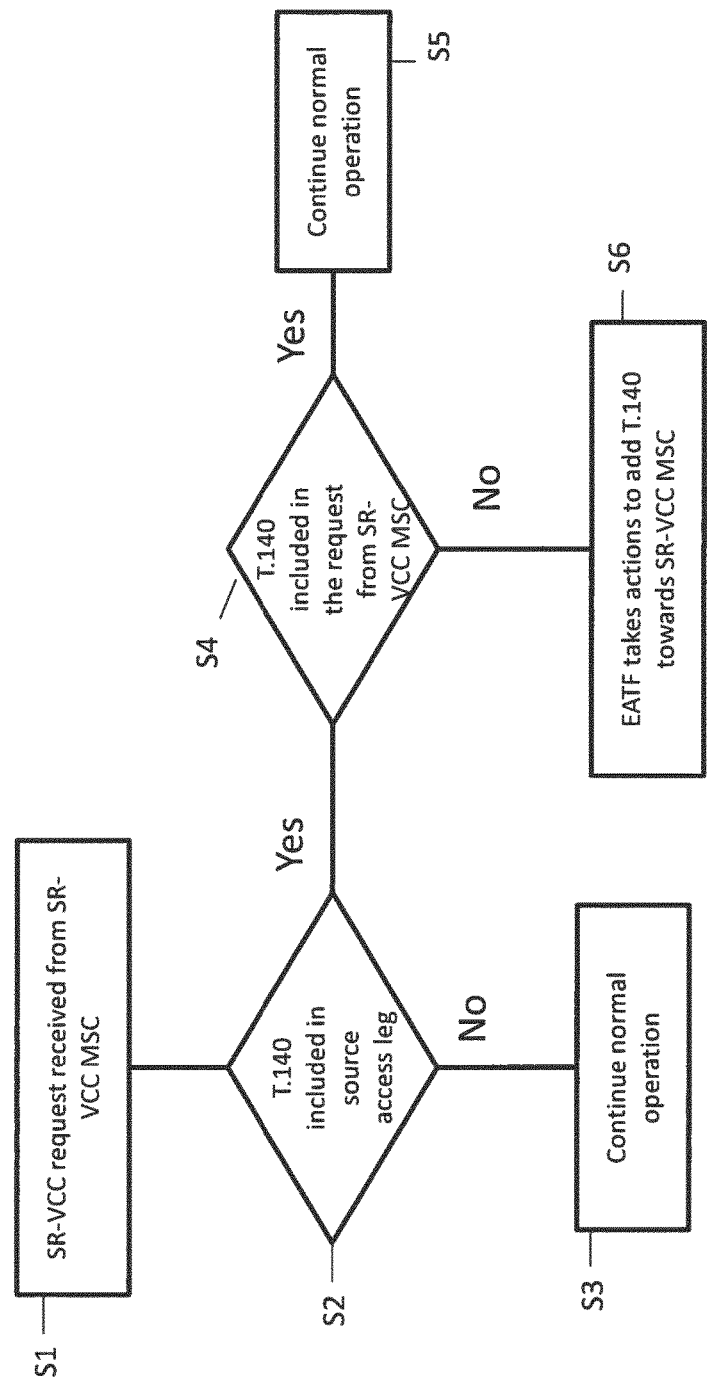
FIG. 7 shows a flow diagram according to an embodiment.

FIG. 7 shows decision logic in a node. This may be applicable to, for example, the EATF 514 and 614 in the embodiments of FIGS. 5 and 6.

At step S1 the SR-VCC request is received at the EATF from SR-VCC MSC.

In response to this, at step S2 the EATF determines whether the source access leg of the request comprises a text call component, such as T.140. If the request does not include a text component, then normal operation can be continued as shown at step S3.

If, on the other hand, it is determined that a text component is included in the source access leg at step S2 then the procedure continues to step S4 where a determination is made as to whether a text call component is included in the request from the SR-VCC MSC. If the determination is "yes", then normal operation can be continued as shown at step S5. This may, for example, apply to the embodiments of FIG. 4 and FIG. 8.

If, on the other hand, the determination is "no" then the procedure continues to step S6 where the EATF takes actions to ensure that the text component is added towards the SR-VCC-MSC. This may be applicable to the embodiments of FIG. 5 and FIG. 6. This may help to ensure that the SR-VCC MSC knows to include the text component of the call (such as T.140) during the handover.

Referring still to FIG. 7, "source access leg" refers to the connection prior to handover from LTE to CS. The source access leg is from UE to EATF. The EATF may determine from SIP/SDP that there is T.140 communication ongoing between UE and PSAP as the SIP/SDP contains T.140 media description. That is the EATF may always be aware of the media in LTE side.

Figure 8:
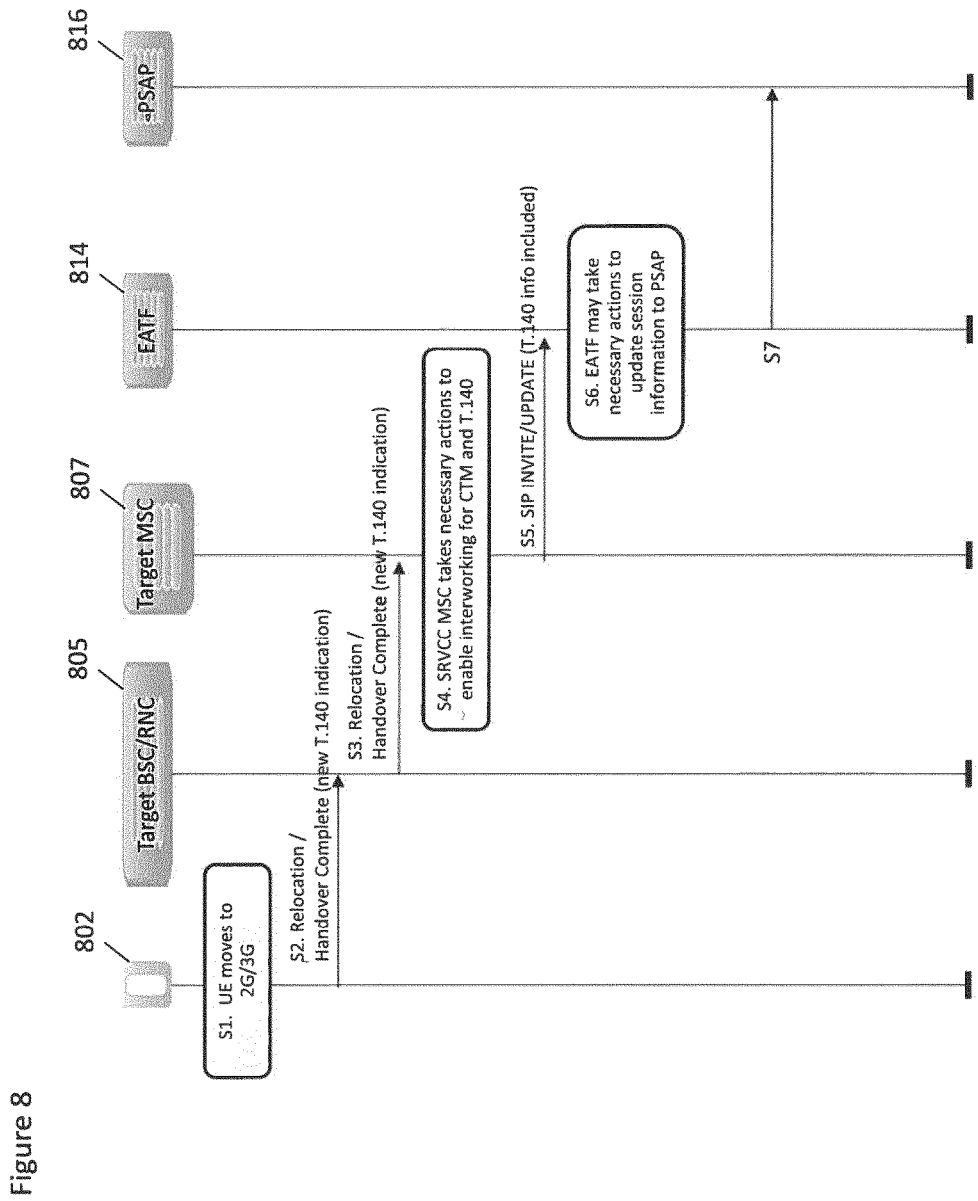
FIG. 8 shows a signalling diagram according to another embodiment.

When handover occurs then depending on the embodiment T.140 information is included or not included in the request from SR-VCC to EATF. If the embodiments shown in FIG. 4 or FIG. 8 are used then the SR-VCC MSC is aware of T.140 media and can indicate T.140 to EATF. On the other hand, in the embodiments of FIG. 5 and FIG. 6 the SR-VCC MSC may not be aware of T.140 when it sends the first message to the EATF (step 4 of FIG. 5 and step 4 of FIG. 6).

Accordingly, as shown in and described with respect to FIG. 7, the EATF may need to analyse the incoming request and take necessary actions e.g. if it is determined that the SR-VCC MSC is not aware of the T.140 media then the EATF may make it aware (as shown in FIGS. 5 and 6)

A further embodiment is shown with respect to FIG. 8. This embodiment may utilise the handover (HO) command procedure.

As shown at step S1, a UE 802 moves to a 2G/3G area. Consequently a handover is required to provide services for the UE in the 2G/3G area.

At step S2, and following the handover, the UE 802 sends a relocation/handover complete message to a target BSC/RNC 805. This message includes information about real-time text (e.g. T.140) that the UE had in progress prior to the handover. This may be information regarding the T.140 protocol call.

At step S3 the target BSC/RNC 805 forwards the relocation/handover complete message (including the text (T.140) information) to a target SRVCC-MSC 807.

At step S4 the SRVCC-MSC 807 take the necessary actions to enable interworking/continuance of the text component e.g. CTM and T.140 following handover.

Following this, and at step S5 the EATF 814 may take necessary action to update session information, such that this information can be sent to the PSAP 816.

At step S7 this information is sent from the EATF 814 to PSAP 816.

Considering FIG. 8 in more detail, as per current procedures in TS 23.216, when the SRVCC preparation is ready at the network, the UE may receive a Handover Command via the source RAT (e.g. EUTRAN). The UE then moves to the target RAT (GERAN/UTRAN) and sends a Handover Complete message (step S2) to the BSC/RNC which forwards it to the MSC (step S3).

The Handover Complete message could be extended to include an indication whether the T.140 real-time text is ongoing in the IMS emergency session. Upon reception of the HO complete, if the T.140 indicator is included, the MSC reserves the resources for T.140/CTM transcoder from the MGW and sends a corresponding SDP offer in a re-INVITE or UPDATE to the EATF 814. If the UE has both IMS emergency and regular calls ongoing at the same time when the SRVCC occurs (the regular call may be on hold in this case), the UE may include the T.140 indicator in the HO complete message (step S2) only if the emergency session has the T.140 real time text media.

Accordingly it will be appreciated that embodiments may enable the continuance of a real time text component of a call when handing over between a packet switched connection and a circuit switched connection. The packet switched connection may be within the same network as the circuit switched connection. Alternatively the packet switched connection may be comprised in a different network to the circuit switched connection. The packet switched connection may be in the same cell as the circuit switched connection. Alternatively the packet switched connection may be in a different cell to the circuit switched connection. That is some embodiments may be applicable to handover between networks and/or cells.

Although the embodiments shown in FIGS. 4 to 8 describe maintaining the real-time text component when moving from packet switched to circuit switched, the invention is equally applicable to the reverse operation i.e. moving from a circuit switched connection to a packet switched connection.

Although in the described embodiments the T.140 protocol is described with respect to the packet switched network and the CTM protocol is described with respect to the circuit switched network, it will be appreciated that this is by way of example only and that in other embodiments other protocols may be employed.

Furthermore, although the embodiments are described with respect to an emergency call, it will be appreciated that some embodiments are equally applicable to normal (i.e. non-emergency) calls.

The embodiment described with respect to FIG. 8 may work with both emergency calls and regular calls. This embodiment may also require an internal Application Programme Interface (API) to enable the IMS client in the UE to indicate the ongoing T.140 media to the Radio Resource Control (RRC) layer in the UE.

It is also noted herein that while the above describes exemplifying embodiments of the invention, there are several variations and modifications which may be made to the disclosed solution without departing from the scope of the present invention.

The required data processing apparatus and functions of a base station apparatus, a communication device and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the communication device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method comprising:

receiving, from a node, a request for continuity of a call during or after handover of a user equipment from a packet-switched connection to a circuit-switched connection;

determining whether said call comprises a T.140 real-time text component; and informing said node when it is determined that said call comprises said T.140 real-time text component, wherein said node comprises a mobile switching centre.

2. The method as set forth in claim 1, wherein said T.140 real-time text component comprises a cellular text telephony modem codec component.

3. An apparatus comprising:

at least one processor;

and at least one memory including computer program code;

the at least one memory and the computer program code configured to, with the at least one processor, cause the apparatus at least to:

receive, from a node, a request for continuity of a call during or after handover of a user equipment from a packet-switched connection to a circuit-switched connection;

determine whether said call comprises a T.140 real-time text component; and inform said node when it is determined that said call comprises said T.140 real-time text component, wherein said node comprises a mobile switching centre.

4. The apparatus as set forth in claim 3, wherein said T.140 real-time text component comprises a cellular text telephony modem codec component.

5. A computer program embodied in a non-transitory computer-readable medium, said program comprising computer executable instructions which, when run on one or more processors, perform the method of claim 1.

* * * * *